US 9,652,731 B2

(12) United States Patent
Shucker et al.

(10) Patent No.: US 9,652,731 B2
(45) Date of Patent: *May 16, 2017

(54) MACHINE-READABLE DELIVERY PLATFORM FOR AUTOMATED PACKAGE DELIVERY

(71) Applicant: GOOGLE INC., Mountain View, CA (US)

(72) Inventors: Brian Daniel Shucker, Superior, CO (US); Brandon Kyle Trew, San Francisco, CA (US)

(73) Assignee: GOOGLE INC., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/097,125

(22) Filed: Apr. 12, 2016

(65) Prior Publication Data

US 2016/0224932 A1 Aug. 4, 2016

Related U.S. Application Data

(63) Continuation of application No. 14/268,683, filed on May 2, 2014, now Pat. No. 9,336,506.

(51) Int. Cl.
*G05D 1/00* (2006.01)
*G06Q 10/08* (2012.01)
*G05D 1/02* (2006.01)

(52) U.S. Cl.
CPC .......... *G06Q 10/083* (2013.01); *G05D 1/02* (2013.01); *G05D 1/0202* (2013.01); *G06Q 10/0833* (2013.01)

(58) Field of Classification Search
CPC .................................................... G05D 1/00
See application file for complete search history.

(56) References Cited

U.S. PATENT DOCUMENTS 6,266,142 B1 7/2001 Junkins et al.
7,327,258 B2 2/2008 Fast et al.
(Continued)

FOREIGN PATENT DOCUMENTS

KR 10-2013-0127585 A 11/2013
WO 2015/168573 A1 11/2015
WO 2015/175242 A1 11/2015

OTHER PUBLICATIONS

Hague, M.R.; Muhammad, M.; Swarnaker, D.; Arifuzzaman, M., "Autonomous Quadcopter for product home delivery," Electrical Engineering and Information & Communication Technology (ICEEICT), 2014 International Conference on , vol., No., pp. 1,5, Apr. 10-12, 2014; doi: 10.1109/ICEEICT.2014.6919154.*

(Continued)

*Primary Examiner* — Christle I Marshall
(74) *Attorney, Agent, or Firm* — Johnson, Marcou & Isaacs, LLC

(57) ABSTRACT

A user requests a package delivery from a package delivery system. The package delivery system provides the user with a machine-readable code for display at the delivery location. An aerial delivery device receives, from the package delivery system computing device, information associated with the delivery location of the package. The information comprises information matching the information in the machine-readable code associated with the delivery location and a delivery address. The delivery device secures the package for transporting to the delivery location and transports the package to the delivery address. The delivery device locates the machine-readable code on a display at the delivery address and verifies that the information from the machine-readable code is associated with the package. The delivery device deposits the package on the display.

32 Claims, 5 Drawing Sheets

(56) References Cited

U.S. PATENT DOCUMENTS

| | | | |
|---|---|---|---|
| 9,244,147 | B1 | 1/2016 | Soundararajan et al. |
| 9,336,506 | B2* | 5/2016 | Shucker .............. G06Q 10/083 |
| 2002/0065600 | A1 | 5/2002 | Oka et al. |
| 2002/0156645 | A1 | 10/2002 | Hansen |
| 2003/0196358 | A1 | 10/2003 | Fratzke |
| 2004/0054607 | A1 | 3/2004 | Waddington et al. |
| 2008/0262718 | A1 | 10/2008 | Farwell |
| 2013/0332008 | A1 | 12/2013 | Herman et al. |
| 2014/0022055 | A1 | 1/2014 | Levien et al. |
| 2014/0032034 | A1 | 1/2014 | Raptopoulos et al. |
| 2014/0149244 | A1* | 5/2014 | Abhyanker .......... G06Q 10/087 705/26.2 |
| 2014/0204360 | A1* | 7/2014 | Dowski, Jr. ............ G05D 1/101 356/4.01 |
| 2014/0254896 | A1* | 9/2014 | Zhou ..................... B25J 9/0006 382/124 |
| 2014/0278099 | A1 | 9/2014 | Schenken |
| 2015/0317597 | A1 | 11/2015 | Shucker et al. |
| 2015/0332206 | A1 | 11/2015 | Trew et al. |
| 2016/0117934 | A1 | 4/2016 | Soundararajan et al. |

OTHER PUBLICATIONS

Kirk, "U.S. Office Action issued in copending U.S. Appl. No. 14/276,841, filed May 13, 2014", mailed on Dec. 22, 2016, 25 pages.

Berthon, "International Search Report and Written Opinion issued in International Application No. PCT/US2015/028817", mailed on Jul. 14, 2015, 10 pages.

Berthon, "International Search Report and Written Opinion issued in International Application No. PCT/US2015/028823", mailed on Jul. 14, 2015, 10 pages.

Dunn, "U.S. Office Action issued in copending U.S. Appl. No. 14/520,987, filed Oct. 22, 2014", mailed on May 28, 2015, 8 pages.

Marshall, "U.S. Office Action issued in copending U.S. Appl. No. 14/268,683, filed May 2, 2014", mailed on Sep. 28, 2015, 6 pages.

Marshall, "U.S. Office Action issued in copending U.S. Appl. No. 14/268,683, filed May 2, 2014", mailed on Apr. 20, 2015, 9 pages.

Wittmann-Regis, "International Preliminary Report on Patentability issued in International Application No. PCT/US2015/028817", mailed on Nov. 17, 2016, 8 pages.

Rees, "Australian Office Action issued in Australian Application No. 2015252879", mailed on Nov. 11, 2016, 2 pages.

Wittmann-Regis, "International Preliminary Report on Patentability issued in International Application No. PCT/US2015/028823", mailed on Nov. 24, 2016, 8 pages.

U.S. Appl. No. 14/275,545 to Trew et al. filed May 12, 2014.

U.S. Appl. No. 15/383,520 to Soundararajan et al. filed Dec. 19, 2016.

Singh, "U.S. Office Action issued in copending U.S. Appl. No. 14/275,545, filed May 12, 2014", mailed on Feb. 8, 2017, 33 pages.

Kim, "Korean Office Action issued in Korean Application No. 10-2016-7032993", mailed on Mar. 9, 2017, 7 pages of English Translation and 6 pages of Korean Office Action.

Won, "Drone (UAV, UAV)", Drones' Airstrike: Commercial Drones Bloomed Beyond Defense, Retrieved from Internet Article: <http://cfile203.uf.daum.net/attach/2647D73B535155A11A68B3>, Apr. 17, 2014 19 pages.

* cited by examiner

MACHINE-READABLE DELIVERY PLATFORM FOR AUTOMATED PACKAGE DELIVERY

CROSS-REFERENCE TO RELATED APPLICATIONS

This application is a continuation of and claims priority to U.S. patent application Ser. No. 14/268,683, filed May 2, 2014, and entitled "Machine-Readable Delivery Platform for Automated Pachage Delivery." The entire contents of the above-identified priority application are hereby fully incorporated herein by reference.

TECHNICAL FIELD

The present disclosure relates generally to automated package delivery, and more particularly to providing a machine-readable delivery platform for an automated package delivery.

BACKGROUND

Delivery services (also known as courier services, mail services, and shipping services), such as those offered by the U.S. Postal Service and commercial carriers, provide delivery of letters, packages, and parcels (hereinafter referred to as "packages") to and from residences and businesses across the country. Other delivery services may be provided by merchants, retailers, manufacturers, or other organizations that desire to deliver products to users. Typically, such services operate in a hub and spoke architecture.

A typical nationwide or international delivery service maintains a large fleet of vehicles. Such vehicles include airplanes and semi-trailer trucks to move packages between hubs and spokes, and smaller vehicles for the "last mile" from spoke endpoints to delivery destinations (for example a home or business). In-between, the two largest commercial delivery services in the U.S. operate over 100,000 last mile vehicles—each of which requires a human operator. In certain situations, some interaction with a person at pickup or delivery is desired, for example, for proof of delivery, for payment on delivery (also known as "cash on delivery" or "COD"), or payment of delivery costs on pickup. The growth of business-to-consumer e-commerce, for example, online shopping, is expected to continue to increase the demand for delivery services and hence the need for capacity and efficiency in the last mile.

Unmanned aerial delivery devices are problematic for delivery to users. For example, an aerial delivery device that is powered by a rotor or an impeller may be dangerous to pets, overhead power lines, ceiling fans, or other features or residents at a delivery location. Furthermore, the aerial delivery device may not recognize a safe place to deliver a package. For example, leaving the package on the front porch of a busy street address may make it more likely that the package is stolen. Detailed delivery instructions to an unmanned aerial delivery device may be difficult for the limited vision system of the aerial delivery device to interpret. Thus, conventional aerial delivery device methods do not allow for safe, secure delivery of packages to delivery locations.

SUMMARY

In certain example aspects described herein, a computer-implemented method for automated package delivery is provided. In an example embodiment, the method provides receiving, by one or more computing devices, a request for a package delivery, the request comprising an identification of a package and an identification of the delivery address. The computing device associates the package with a delivery device and associates, with the delivery address, a machine-readable code. The machine-readable code is for display in a location for the package to be deposited. The computing device transmits to the delivery device the information associated with the delivery location at the delivery address and the information comprising the machine-readable code.

In certain other example aspects described herein, a system and a computer program product for automated package delivery are provided.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

Figure 1:
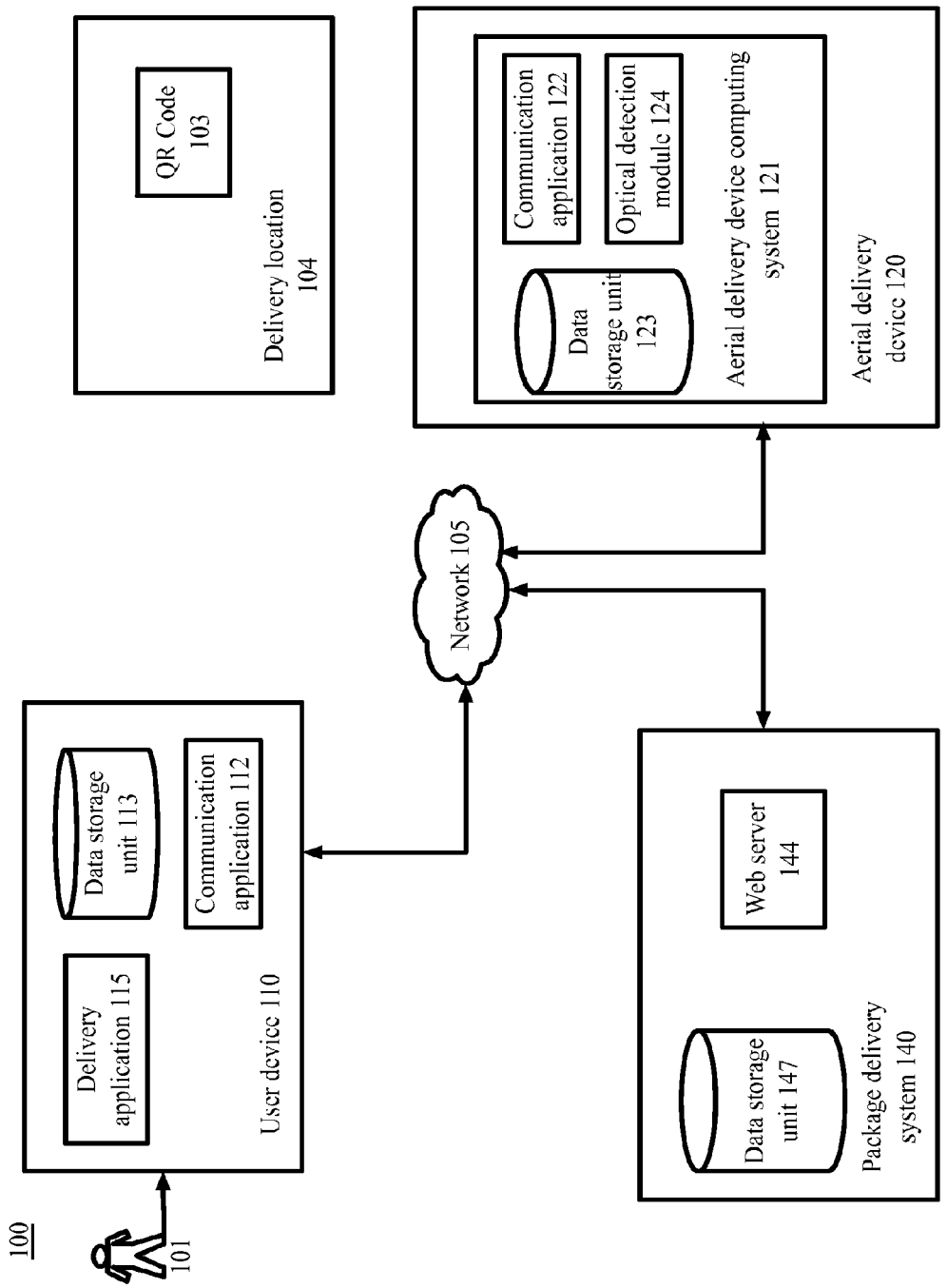
FIG. 1 is a block diagram depicting a system for an aerial delivery device to deliver a package, in accordance with certain example embodiments.

The example embodiments described herein provide computer-implemented techniques for providing a machine-readable "landing pad" delivery location for an automated package delivery via a drone. In an example embodiment, a user is provided with a machine-readable code, such as a QR code, for display on a landing pad. An aerial delivery device, such as a drone, detects the QR code and verifies the package to be delivered matches the QR code displayed. The aerial delivery device deposits the package on the landing pad.

In an example, a package delivery system identifies a package for delivery to a user. The package delivery system may be a warehouse depot for a merchant system or manufacturer. The package delivery system may be a courier service, a package delivery agent, or any suitable system. The package delivery system identifies a destination for the package, such as the residence of the user. The package is associated with an aerial delivery device for delivery.

The user is provided with a machine-readable code for display at the preferred delivery location. The machine-readable code may be any code that is detectable by the aerial delivery device. The code may be a QR code, barcode, or any other suitable code. The user may be provided with a digital version of the code or a printed display of the code. The user may print a version of the code for display.

The user identifies a location for displaying the code. The location may be selected to allow a safe, secure deposit of the package. For example, if the user has a pet that may be injured by rotating blades on the aerial delivery device, then a location that is raised above the ground may prevent the pet from reaching the aerial delivery device. In another example, the user may select a location that is not directly under power lines or an antenna. In another example, the user may select a location that will prevent the package from being in view of passersby. The user displays the code in a manner that it can be viewed from above by the aerial delivery device. For example, the user affixes the printed code to a platform for delivery or places an electronic display of the code on the platform.

The package delivery system provides the delivery location to the aerial delivery device. For example, the package delivery system provides an address for a user residence. In another example, the package delivery system provides a GPS location to the aerial delivery device. Any suitable instructions that will allow the aerial delivery device to locate the delivery location may be used.

Upon arrival at the user address, the aerial delivery device uses an optical detection technology to locate the code. For example, the aerial delivery device may hover over the specified address and locate the code. The aerial delivery device then approaches the location containing the code. The aerial delivery device deposits the package onto the location containing the code and notes the delivery of the package.

Example System Architecture

Turning now to the drawings, in which like numerals indicate like (but not necessarily identical) elements throughout the figures, example embodiments are described in detail.

FIG. 1 is a block diagram depicting a system 100 for an aerial delivery device to deliver a package, in accordance with certain example embodiments. As depicted in FIG. 1, the system 100 includes network computing devices 110, 120, and 140 that are configured to communicate with one another via one or more networks 105. In some embodiments, a user associated with a device must install an application and/or make a feature selection to obtain the benefits of the techniques described herein.

The network 105 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, NFC, or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network computing device 110, 120, and 140 includes a device having a communication module capable of transmitting and receiving data over the network 105. For example, each network computing device 110, 120, and 140 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network computing devices 110, 120, and 140 may be operated or configured by users 101, aerial delivery device operators, and package delivery system operators, respectively.

An example user computing device 110 comprises a data storage unit 113, a delivery application 115, and a communication application 112. In an example embodiment, a user interface enables the user 101 to interact with the delivery application 115 and/or the communication application 112. For example, the user interface may be a touch screen, a voice-based interface or any other interface that allows the user 101 to provide input and receive output from an application or module on the user computing device 110.

In an example embodiment, the data storage unit 113 comprises a local or remote data storage structure accessible to the user computing device 110 suitable for storing information. In an example embodiment, the data storage unit 113 stores encrypted information, such as HTML5 local storage.

In an example embodiment, the user 101 can use a communication application 112, such as a web browser application or a delivery application 115, to view, download, upload, or otherwise access documents or web pages via a distributed network 105.

In an example embodiment, the delivery application 115 is a program, function, routine, applet, or similar entity that exists on and performs operations on the user computing device 110. In certain embodiments, the user 101 must install the delivery application 115 and/or make a feature selection on the user computing device 110 to obtain the benefits of the techniques described herein. In an example embodiment, the user 101 may access the delivery application 115 on the user computing device 110 via a user interface. In an example embodiment, a user 101 signs in to the delivery application 115, which enables the user 101 to interact with the package delivery system 140, a merchant system, or other system to arrange, alter, or cancel the delivery of a product.

An example package delivery system 140 comprises a web server 144 and a data storage unit 147. In an example embodiment, the package delivery system 140 communicates with the user device 110, merchant systems, other package delivery systems, or any other person, group, or system that delivers or receives packages. In an example embodiment, user device 110 has a delivery application 115 distributed by the package delivery system 140 that enables the user 101 to access an account or information about a package. In another example embodiment, the user 101 accesses an account via the communication application 112 of the user device 110. In an example embodiment, when the user 101 accesses his account via the delivery application 115 or communication application 112, the web server 144 logs user device 110 location data.

The package delivery system 140 may represent any system that delivers or receives packages. For example, the package delivery system 140 may be a courier, a merchant system, a retailer, a shipping company, a postal service, or any suitable system.

The aerial delivery device 120 may be a drone or other unmanned vehicle. The aerial delivery device 120 may be helicopter, quadcopter, or other aerial delivery device. In alternative embodiments, a device other than an aerial delivery device can be utilized, which does not deliver packages via flight. For example, a wheeled vehicle or other vehicle that delivers packages without flight may be used.

In an example, the non-flying delivery device may utilize wheels, articulated legs, or any suitable means for propulsion. The non-flying delivery device may drive to a location, scan for the QR code 103, and proceed to the QR code 103 by rolling, walking, or via any suitable propulsion. The non-flying delivery device may deposit the package via an articulated arm, a conveyor belt, or any other suitable means.

The aerial delivery device 120 employs an aerial delivery device computing system 121. The aerial delivery device computing system 121 comprises the hardware, software, and other devices for communications, navigations, image capturing, image processing, and any other suitable computerized or automated functions.

The aerial delivery device computing system 121 comprises a communication application 122, an optical detection module 124, and a data storage unit 123. The aerial delivery device computing system 121 may utilize a communication application 122 to receive instructions for package deliveries. For example, the aerial delivery device computing system 121 may receive, via the communication application 122, delivery addresses, GPS locations, package details, or other delivery information. The aerial delivery device computing system 121 may utilize the data storage unit 123 for storing the information received via the communication application, and other suitable data.

The optical detection module 124 may be a video camera or a still camera that captures images. The optical detection module 124 may be a barcode scanner, a QR code 103 scanner, or any suitable optical detection module 124. The aerial delivery device computing system 121 analyzes image to identify a QR code 103. The aerial delivery device computing system 121 determines a location of QR code 103 and navigates to the code by analyzing the image of the location and utilizing other data for navigating to the QR code 103. For example, the aerial delivery device computing system 121 may maintain a constant optical image of the QR code 103 and move to keep the QR code 103 in picture.

The aerial delivery device computing system 121 may also comprise a navigation system, such as a global positioning system ("GPS") or other navigation system. For example, the aerial delivery device computing system 121 may have a mapping system stored in the data storage unit 123 that works alone or in conjunction with onboard GPS technology to assist the aerial delivery device computing system 121 with navigation.

The delivery location 104 is a platform, landing pad, table, unobstructed area of lawn, or any other suitable location for receiving the package from the aerial delivery device 120. The QR code 103 may be displayed on the delivery location as described herein.

It will be appreciated that the network connections shown are example and other means of establishing a communications link between the computers and devices can be used. Additionally, those having ordinary skill in the art having the benefit of the present disclosure will appreciate that the user computing device 110, the aerial delivery device 120, and the package delivery system 140 illustrated in FIG. 1 can have any of several other suitable computer system configurations. For example, a user computing device 110 embodied as a mobile phone or handheld computer may or may not include all the components described above.

Example Processes

Figure 2:
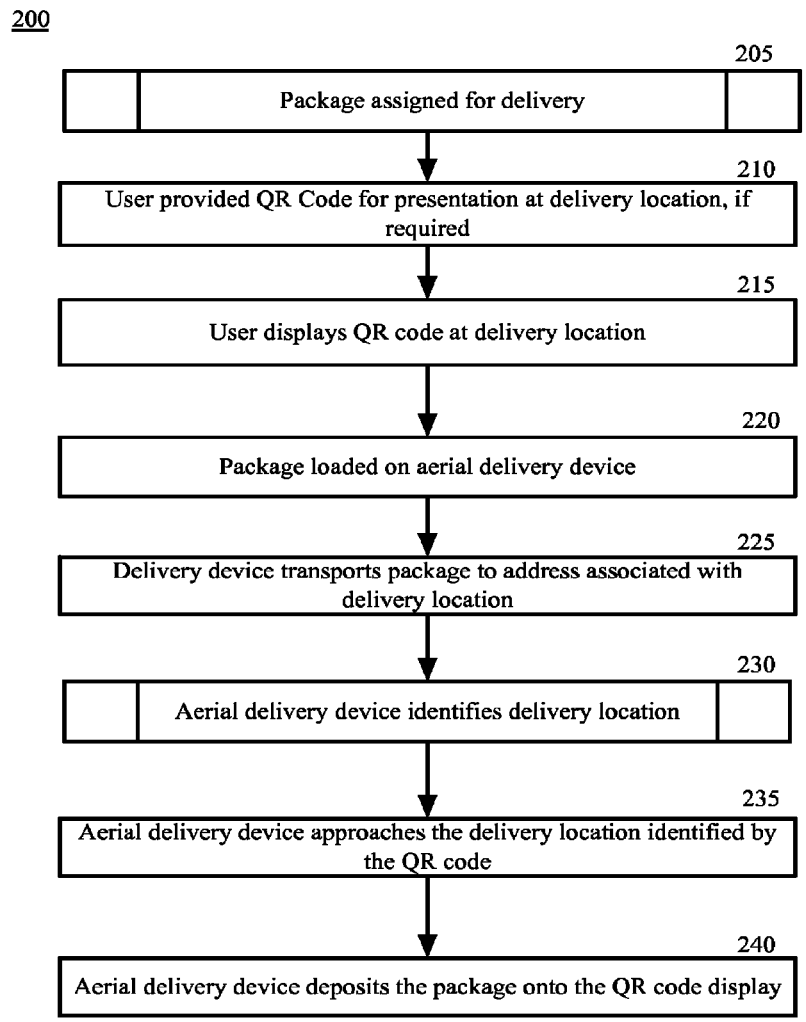
FIG. 2 is a block flow diagram depicting a method for an aerial delivery device to deliver a package, in accordance with certain example embodiments.
Figure 3:
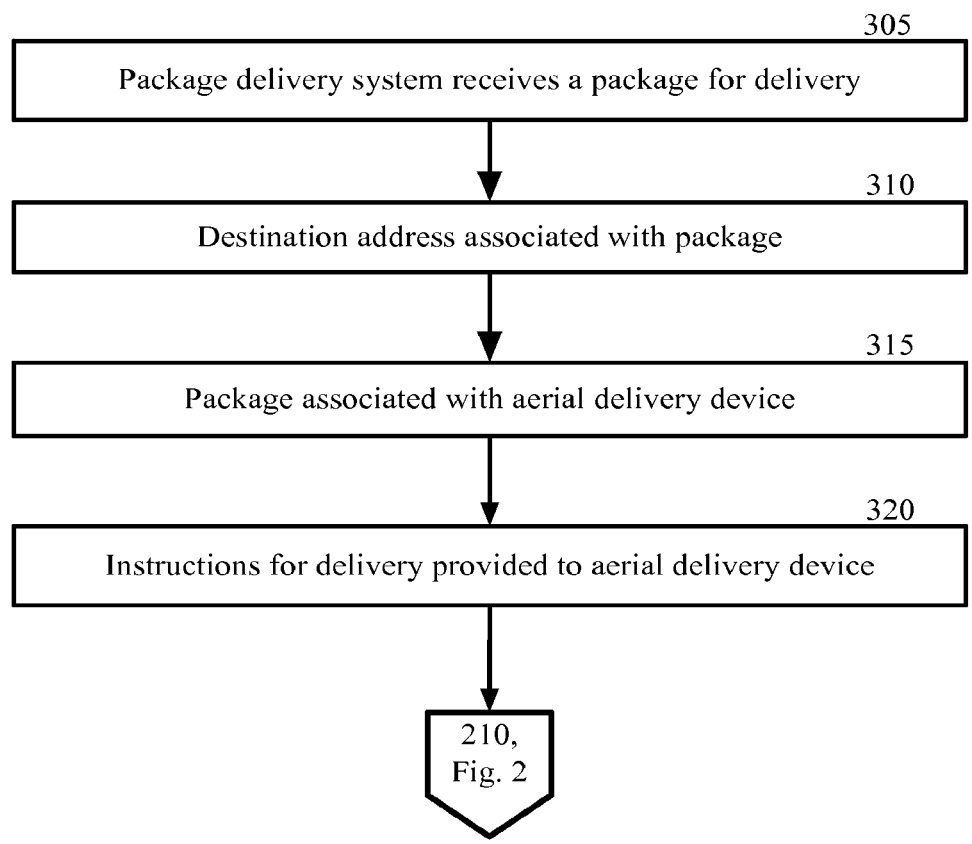
FIG. 3 is a block flow diagram depicting a method for a package to be assigned for delivery, in accordance with certain example embodiments.
Figure 4:
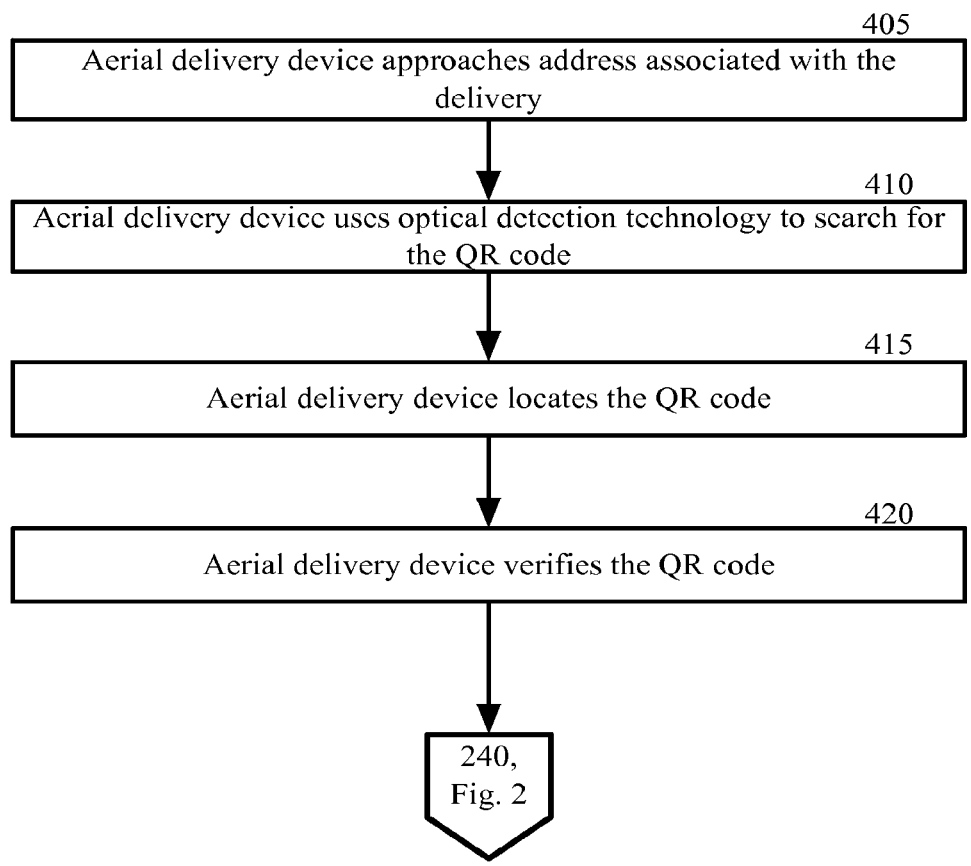
FIG. 4 is a block flow diagram depicting a method for an aerial delivery device to identify a delivery location, in accordance with certain example embodiments.

The example methods illustrated in FIGS. 2-4 are described hereinafter with respect to the components of the example operating environment 100. The example methods of FIGS. 2-4 may also be performed with other systems and in other environments.

FIG. 2 is a block diagram depicting a method 200 for an aerial delivery device to deliver a package, in accordance with certain example embodiments. The method 200 is described with reference to the components illustrated in FIG. 1.

In block 205, a package is assigned for delivery. The package may be any product for delivery to user 101, a merchant, or other recipient. The details of block 205 are described in greater detail in FIG. 3.

FIG. 3 is a block diagram depicting a method 205 for a package to be assigned for delivery, in accordance with certain example embodiments. The method 205 is described with reference to the components illustrated in FIG. 1.

In block 305, a package delivery system 140 receives a package for delivery. The package delivery system 140 may be any system, company, organization, government service, or individual that delivers packages from one location to another. For example, the package delivery system 140 may be a courier, postal service, package delivery company, a merchant system, a retailer, or any other suitable system that delivers packages. The package for delivery arrives at the package delivery system 140 with appropriate paperwork for delivery to a user 101. The paperwork may be digital, a barcode or other machine-readable code, a sticker, or any suitable paperwork. The paperwork may contain a user 101 name, a user address, a confirmation number, a sender name and address, and other identifying information for the recipient, sender, origin location, and/or delivery location 104.

The delivery information may be provided by the sender of the package or by the user 101. For example, the sender or the user 101 may enter the delivery information into a website of the package delivery system 140. In another example, the sender or the user 101 may enter the delivery information into a delivery application 115 or in any suitable manner input delivery instructions that are communicated to the package delivery system 140.

In block 310, a destination address is associated with the package. For example, the package delivery system 140 obtains the delivery address from the paperwork or digital information associated with the package. The delivery address is stored with identification of the package in the package delivery system 140.

In block 315, the package delivery system 140 associates the package with an aerial delivery device computing system 121. The package delivery system 140 may identify an aerial delivery device 120 that is associated with a delivery area in which the delivery address is located. For example, certain aerial delivery devices 120 may be assigned a delivery route that encompasses a particular geographic region. If the delivery address is located in that geographic region, then the package may be associated with that particular aerial delivery device 120. In an alternate embodiment, the package is associated with the aerial delivery device 120 that is next in a queue of aerial delivery devices 120.

In block 320, the instructions for delivery of the package are provided to the aerial delivery device computing system 121. In an example embodiment, the instructions are delivered to the communication application 122 of the aerial delivery device computing system 121 via near field communication, Bluetooth, Wi-Fi, or any available communication. The instructions may be transmitted to the aerial delivery device computing system 121 by a computing system associated with the package delivery system 140. For example, an operator of the package delivery system 140 may direct a computing system to deliver the instructions, or the operator may enter the instructions directly into a user interface of the aerial delivery device computing system 121. Any suitable manner of transmitting the instructions to the aerial delivery device computing system 121 may be used.

For example, the package delivery system 140 provides to the aerial delivery device computing system 121 an address for a user residence. In another example, the package delivery system provides a GPS location to the aerial delivery device. Additionally, the aerial delivery device computing system 121 is provided with the QR code 103 associated with a landing platform to which the package should be delivered. That is, the QR code 103 that the package recipient is to display for receipt of the package is transmitted to the aerial delivery device computing system 121 for association with the package. Any suitable instructions that will allow the aerial delivery device to locate the delivery location 104 may be used.

From block 320, the method 305 returns to block 210 of FIG. 2.

Returning to FIG. 2, in block 210, the user 101 is provided a QR code 103 for presentation at the delivery location 104. In an example embodiment, the QR code 103 is provided to the user as a printed display. For example, the QR code 103 may be printed on a weatherproof sheet and mailed to user location for multiple uses. In another example, the user may purchase or create a QR code display for multiple uses. In an alternative embodiment, the digital QR code 103 may be transmitted to the user 101 by the package delivery system 140, a merchant system, or other entity. The user 101 may print the digital QR code 103 or otherwise transcribe the QR code 103 onto a display sheet or digitally display the QR code 103 via a laptop computer, electronic reading device, or other electronic display.

The "QR code" 103 is representative of any machine-readable code. For example, the code maybe a, barcode, an alphanumeric code, or other suitable machine-readable identifier. In an alternate environment, the code may be a picture, an icon, a logo, or any suitable image. The phrase "QR code" 103 is used herein to represent any suitable image or code.

In an example embodiment, the QR code 103 is unique to the user 101 or to the transaction. Reading the QR code 103 is a sufficient indication for the aerial delivery device computing system 121 or the package delivery service 140 to trust that the delivery location 104 is accurate. In the example embodiment, the QR code 103 protects the identity of the user 101. For example, if a reading device that is not associated with the user 101 or the package delivery service 140 reads the QR code 103 on the landing pad, the reading device would not gain access to the name of the user 101 or any other user information. Specifically, the reading device would not be allowed to gain enough information about the user 101 or the order to place a fraudulent order or commit any other manner of fraud.

One method to generate an appropriate QR code 103 is to obtain a password and an identification of the user 101. A QR code generator that is associated with the package delivery system 140 may use various data to create unique QR codes 103. Alternatively, the QR code generator is associated with the user computing device 110 or another device. The QR code generator combines the password with a unique identification number for the user 101 and processes the combination of the data through a cryptographic hash function, such as SHA-1. Cryptographic hashes are noninvertible. Thus, the hash code may be generated from the password and identification. However, with only the hash code, the QR code 103 may not be inverted to obtain the password or identification. Furthermore, the QR codes 103 are collision-resistant, such that with the hash code, a method does not exist to find any other combination of password and identification that creates the same hash code. So, with this method, the codes are unique, and a bystander who reads the code is unable to obtain any useful data, whether visually or via a reading device.

The QR code 103 is generated by the QR code generator and is associated with the user 101 and with the package. The QR code 103 is stored by the package delivery system 140 along with the identification of the user 101 and the package.

In block 215, the user 101 displays the QR code 103 at a delivery location 104. The user 101 identifies a location for displaying the code. The location may be selected to allow a safe, secure deposit of the package. For example, if the user 101 has a pet that may be injured by rotating blades on the aerial delivery device, then a location that is raised above the ground may prevent the pet from reaching the aerial delivery device 120. In another example, the user 101 may select a location that is not directly under power lines or an antenna. In another example, the user 101 may select a location that will prevent the package from being in view of passersby. The user 101 displays the code in a manner that it can be viewed from above by the aerial delivery device computing system 121. For example, the user 101 affixes the printed code to a platform for delivery.

In block 220, the package is loaded onto the aerial delivery device 120. The package may be loaded in any suitable manner that allows the aerial delivery device 120 to transport the package to the delivery location 104. For example, the aerial delivery device 120 may be equipped with a platform for supporting the package during transit. In another example, the aerial delivery device 120 may support the package with a strap, a hook, an attached net, a winch, or with any suitable attachment device. The package maybe loaded with an automated packaging process. Alternatively, the package maybe loaded manually by an operator at the package delivery system 140. The aerial delivery device computing system 121 may receive a digital confirmation of the package's identification from an operator or a computing system of the package delivery system 140.

In block 225, the aerial delivery device 120 transports the package to the address associated with the delivery location 104. The aerial delivery device 120 may proceed to the address associated with the user 101. For example the aerial delivery device 120 may fly to the address via a predetermined route. In an example embodiment, the aerial delivery device computing system 121 may navigate via a mapping program to proceed to the address by following a route provided by the mapping program to reach the destination address of the user 101. In an alternative example embodiment, the aerial delivery device computing system 121 may navigate via a global positioning system ("GPS") technology to the destination address of the user 101. The aerial delivery device 120 may be transported a portion of the distance to the delivery address by a separate vehicle. For example, a delivery truck may deliver multiple aerial delivery devices 120 to within a location that is central to multiple delivery addresses. The aerial delivery device 120 then leaves the delivery truck and travels the remaining distance with the package.

In an example embodiment, the aerial delivery device 120 arrives at the address of the delivery location 104 when the aerial delivery device 120 is on or above the street directly in front of the structure at the address. In another example, the aerial delivery device 120 hovers over the property located at the address. The aerial delivery device computing system 120 may confirm the arrival at the delivery address by comparing the appearance of the delivery address with a digital image of the digital address provided by the package delivery system 140 or other suitable provider.

In block 230, the aerial delivery device computing system 121 identifies the preferred delivery location 104 at the delivery address. Block 230 is described in greater detail with reference to FIG. 4.

FIG. 4 is a block flow diagram depicting a method 230 for an aerial delivery device 120 to identify a delivery location 104, in accordance with certain example embodiments. The method 230 is described with reference to the components illustrated in FIG. 1.

In block 405, the aerial delivery device 120 approaches the address associated with the delivery. In a certain embodiment, the aerial delivery device computing system 121 has not been provided with the positioning of the delivery platform at the delivery address. For example, the aerial delivery device computing system 121 is only provided with information specifying that the QR code 103 is located on the property associated with the destination address. The aerial delivery device 120 may proceed to a position over the property at the delivery address to achieve an improved perspective. Alternatively, the aerial delivery device 120 may traverse the airspace over the property of the delivery address to allow the optical detection module 124 to obtain a thorough visual coverage of the delivery address.

In a certain embodiment, the aerial delivery device computing system 121 has been provided with information associated with the positioning of the delivery platform at the delivery address. For example, if the package delivery system 140 provided information that the delivery platform with the QR code 103 is located on the back patio, then the aerial delivery device 120 flies directly to the back patio via a predetermined route or by the shortest possible path. Other example delivery locations might include on a front porch, on an upstairs balcony, behind a fence gate, on a loading dock, or in any suitable location. If the aerial delivery device computing system 121 has been provided with the delivery platform location, then the aerial delivery device 120 may proceed to that general location on the property of the user 101.

In block 410, the aerial delivery device computing system 121 uses optical detection technology to search for the QR code 103 on a delivery platform. For example, the aerial delivery device computing system 121 utilizes cameras or other optical detection devices 124 to scan the delivery address in search of the QR code 103. Optical character recognition, image recognition, code recognition, or other digital processing applications may be utilized to identify a QR code 103 or other code or image on the delivery platform.

In block 415, the aerial delivery device computing system 121 locates the QR code 103. The aerial delivery device computing system 121 locates one or more QR codes 103 displayed on the property of the delivery address. In certain embodiments, the QR code 103 may be displayed on a designation landing area, such as a landing platform. The aerial delivery device computing system 121 may utilize any suitable image processing algorithm to locate and identify the QR code 103 on the property of the delivery address.

In block 420, the aerial delivery device computing system 121 verifies the QR code 103. The aerial delivery device computing system 121 identifies the QR code 103 with the optical detection technology and obtains the QR code data. The aerial delivery device computing system 121 compares the detected QR code data to expected QR code data for the delivery address. For example, the aerial delivery device computing system 121 compares the detected QR code 103 to the information that was previously transmitted to the aerial delivery device computing system 121 by the package delivery system 140. In an alternate embodiment, the aerial delivery device computing system 121 transmits the QR code 103 to the package delivery system 140 for confirmation of delivery location 103 by the package delivery system 140. If the detected QR code 103 matches the expected QR code, then the method 230 proceeds to block 240 of FIG. 2. If the QR code 103 does not match the expected QR code, then the aerial delivery device computing system 121 detects one or more subsequent QR codes. If one of the subsequent QR codes matches the expected QR code, then the method 230 proceeds to block 240 of FIG. 2. If a QR code 103 is not detected that matches the expected QR code, then the method 230 aborts the delivery. If the delivery is aborted, the aerial delivery device computing system 121 communicates to the package delivery system 140 that the delivery has been aborted. Alternatively, the aerial delivery device 120 returns the package to the package delivery service 120 for further processing.

In certain embodiments, a delivery address may employee more than one QR code 103 display for delivery. For example, a commercial location may desire to receive different packages in different locations. The aerial delivery device computing system 121 locates the QR code 103 that is associated with package.

From block 420, the method 230 returns to block 235 of FIG. 2.

Returning to FIG. 2, in block 235, the aerial delivery device 120 approaches the delivery location 103 identified by the QR code 103. After verifying the appropriate QR code 103, the delivery device determines an appropriate method for approaching the delivery platform with the QR code 103. For example, the aerial delivery device computing system 121 determines via an optical analysis of the location if the delivery platform is under a roofline, power lines, trees, or other obstructions. The aerial delivery device computing system 121 selects a path that will avoid the obstructions by analyzing the optical scan of the location and plotting an appropriate path. In another example, the aerial delivery device computing system 121 selects a path to the delivery platform that minimizes any encroachment on a neighboring address.

In a certain embodiment, the aerial delivery device computing system 121 is provided an approach path to the delivery platform by the package delivery service 140. For example, a user 101 or an operator for the package delivery service 140 may determine the safest delivery path from a street to the delivery platform. The safest delivery path may be stored by the package delivery service 140 and associated with the delivery address. The safest delivery path maybe transmitted to the aerial delivery device computing system 121 with the instructions for delivery or they may be transmitted after the QR code 103 is identified.

In block 240, the aerial delivery device 120 deposits the package onto the delivery platform displaying the QR code 103. For example, the aerial delivery device 120 may lower the package via a retractable line or cable and then release the package onto the delivery platform. In another example, the aerial delivery device 120 hovers over the delivery platform and releases the package allowing the package to drop to the delivery platform, where the vertical drop distance is maintained below a predetermined threshold height to prevent damage to the package. The aerial delivery device 120 may deposit the package in any suitable manner.

After depositing the package, the aerial delivery device computing system 121 may obtain a visual image verification that the package has been delivered. For example, the aerial delivery device computing system 121 may capture a digital image of the package resting on the QR code 103 with an optical detection module 124 located on the aerial delivery device computing system 121. Any other manner of verifying the delivery may be utilized. The aerial delivery device computing system 121 stores a confirmation that the package has been delivered. Additionally or alternatively, the aerial delivery device computing system 121 transmits the delivery confirmation to the package delivery system 140 and/or to the user computing device 110.

The aerial delivery device 120 returns to the package delivery system location or proceeds to deliver a subsequent package.

Other Example Embodiments

Figure 5:
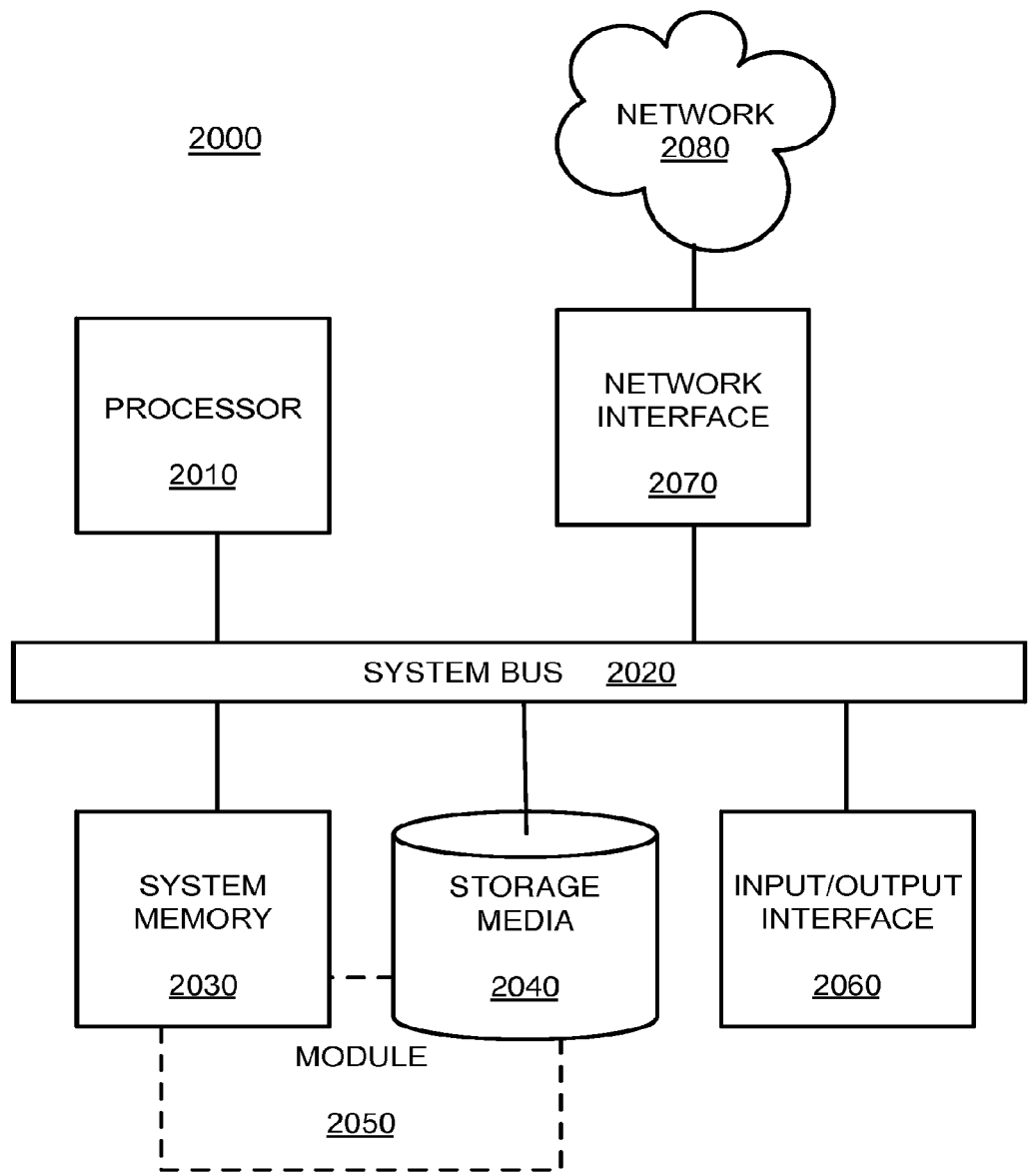
FIG. 5 is a block diagram depicting a computing machine and module, in accordance with certain example embodiments.

FIG. 5 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, a television with one or more processors embedded therein and/or coupled thereto, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to automate package deliveries, comprising:

receiving, by one or more computing devices, a request for a package delivery, the request comprising an identification of a package and an identification of a delivery location;

associating, by the one or more computing devices, the package with a delivery device;

associating, by the one or more computing devices, delivery information with the delivery location, wherein the delivery information comprises an image to be printed for display in a particular location for the package to be deposited at the delivery location; and transmitting, by the one or more computing devices, the delivery information associated with the delivery location to the delivery device for the delivery device to deliver the package to the particular location displaying the printed image at the delivery location.

2. The method of claim 1, wherein the delivery information associated with the delivery location further comprises a GPS location of the delivery location.

3. The method of claim 1, wherein the delivery information associated with the delivery location further comprises an address associated with the delivery location.

4. The method of claim 1, wherein the delivery information associated with the delivery location further comprises instructions for the delivery device to locate the printed image at the delivery location and to deposit the package at the particular location displaying the printed image.

5. The method of claim 1, wherein the delivery device is an aerial drone.

6. The method of claim 1, further comprising transmitting, by the one or more computing devices, the printed image to a user associated with the delivery location.

7. The method of claim 6, wherein the printed image is transmitted to a user computing device associated with the user.

8. The method of claim 1, wherein the printed image is a logo, a picture, or an icon.

9. The method of claim 1, further comprising receiving, by the one or more computing devices, a confirmation from the delivery device that the package has been deposited at the delivery location.

10. A system to deliver packages to specified user locations, comprising:

a storage device associated with a delivery device; and a processor communicatively coupled to the delivery device storage device, wherein the processor executes application code instructions that are stored in the storage device to cause the system to:

receive, from a package delivery system processor, delivery information associated with a package and a particular delivery location at a delivery address;

secure the package for transporting to the delivery location;

transport the package to the delivery address;

locate a printed image at the particular delivery location at the delivery address, the printed image comprising an image associated with the particular delivery location at the delivery address and with the delivery information associated with the package;

verify that the located printed image is associated with the delivery information associated with the package; and deposit the package at the particular delivery location in response to verifying that the located printed image is associated with the delivery information associated with the package.

11. The system of claim 10, wherein the delivery information associated with the delivery location further comprises a GPS location of the delivery location.

12. The system of claim 10, wherein the delivery information associated with the delivery location further comprises an address of the delivery location.

13. The system of claim 10, wherein the printed image is a logo, a picture, or an icon.

14. The system of claim 10, wherein the delivery device is an aerial drone.

15. The system of claim 10, wherein verifying that the printed image comprises at least a portion of the delivery information associated with the package comprises:

transmitting the printed image to the package delivery system; and receiving a verification from the package delivery system that the printed image is associated with the package.

16. A computer program product, comprising:

a non-transitory computer-readable medium having computer-executable program instructions embodied thereon that when executed by a computer cause the computer to deliver packages to specified user locations, the computer-executable program instructions comprising:

computer-executable program instructions to receive a request for a package delivery, the request comprising an identification of a package and an identification of the delivery location;

computer-executable program instructions to associate the package with a delivery device;

computer-executable program instructions to associate delivery information with the delivery location, wherein the delivery information comprises a passive machine-readable code for display in a particular location for the package to be deposited at the delivery location; and computer-executable program instructions to transmit the delivery information associated with the delivery location to the delivery device for the delivery device to deliver the package to the particular location displaying the passive machine-readable code at the delivery location.

17. The computer program product of claim 16, further comprising computer-executable program instructions to transmit the passive machine-readable code to a user associated with the delivery location.

18. The computer program product of claim 16, wherein the information associated with the delivery location further comprises a GPS location of the delivery location.

19. The computer program product of claim 16, wherein the information associated with the delivery location further comprises an address of the delivery location.

20. The computer program product of claim 16, wherein the passive machine-readable code is a QR code or a barcode.

21. The system of claim 10, further comprising:

a package delivery system storage device; and a processor communicatively coupled to the package delivery system storage device, wherein the processor executes application code instructions that are stored in the storage device to cause the system to:

receive a request for a package delivery, the request comprising an identification of the package and an identification of the delivery location;

associate the package with the delivery device;

associate the delivery information with the delivery location, wherein the delivery information comprises the printed image to be displayed in the particular location for the package to be deposited at the delivery location; and transmit the delivery information associated with the delivery location to the delivery device for the delivery device to deliver the package to the particular location displaying the printed image at the delivery location.

22. The system of claim 21, wherein verifying that the printed image is associated with the package comprises:

transmitting the printed image to the package delivery system; and receiving a verification from the package delivery system that the printed image is associated with the package.

23. The system of claim 10, wherein the delivery information associated with the delivery location further comprises instructions for the delivery device to locate the printed image at the delivery location and to deposit the package at the particular location displaying the printed image.

24. The system of claim 21, further comprising application code instructions to transmit the printed image to a user associated with the delivery location.

25. The system of claim 24, wherein the printed image is transmitted to a user computing device associated with the user.

26. The system of claim 21, further comprising application code instructions to receive a confirmation from the delivery device that the package has been deposited at the delivery location.

27. The computer program product of claim 16, wherein the delivery information associated with the delivery location further comprises instructions for the delivery device to locate the passive machine-readable code at the delivery location and to deposit the package at the particular location displaying the passive machine-readable code.

28. The computer program product of claim 16, wherein the delivery device is an aerial drone.

29. The computer program product of claim 16, further comprising computer-readable program instructions to transmit the passive machine-readable code to a user associated with the delivery location.

30. The computer program product of claim 29, wherein the passive machine-readable code is transmitted to a user computing device associated with the user.

31. The computer program product of claim 16, further comprising computer-readable program instructions to receive a confirmation from the delivery device that the package has been deposited at the delivery location.

32. The method of claim 1, further comprising:

receiving from the delivery device, by the one or more computing devices, the printed image to the package delivery system obtained from the display at the delivery location; and transmitting a verification that the printed image is associated with the package.

* * * * *